(12) United States Patent
Bills et al.

(10) Patent No.: US 9,493,051 B2
(45) Date of Patent: Nov. 15, 2016

(54) CHILLED VEHICLE FUEL STORAGE TANK

(71) Applicants: Antwanette Bills, Taylor, MI (US);
Anthony Bills, Taylor, MI (US)

(72) Inventors: Antwanette Bills, Taylor, MI (US);
Anthony Bills, Taylor, MI (US)

( * ) Notice: Subject to any disclaimer, the term of this patent is extended or adjusted under 35 U.S.C. 154(b) by 44 days.

(21) Appl. No.: 14/455,119

(22) Filed: Aug. 8, 2014

(65) Prior Publication Data
US 2016/0039279 A1 Feb. 11, 2016

(51) Int. Cl.
*F02M 37/04* (2006.01)
*B60H 1/00* (2006.01)
*B60K 15/03* (2006.01)

(52) U.S. Cl.
CPC ........... *B60H 1/00271* (2013.01); *B60K 15/03* (2013.01); *B60K 15/03177* (2013.01); *B60K 2015/03414* (2013.01); *B60K 2015/03493* (2013.01)

(58) Field of Classification Search
CPC .................. B60K 15/03006; B60K 15/03177; B60K 2015/03493; B60K 2015/03414; B60K 2015/03427
USPC .................................................. 123/541, 557
See application file for complete search history.

(56) References Cited

U.S. PATENT DOCUMENTS

| | | | | |
|---|---|---|---|---|
| 2,496,466 A | * | 2/1950 | Graham | 62/201 |
| 2,681,551 A | * | 6/1954 | Powell | 62/339 |
| 4,570,446 A | * | 2/1986 | Matsubara et al. | 62/46.2 |
| 5,584,279 A | * | 12/1996 | Brunnhofer | 123/541 |
| 6,581,579 B1 | * | 6/2003 | Knight et al. | 123/516 |
| 8,528,774 B2 | * | 9/2013 | Jorgensen | 220/563 |
| 2012/0060464 A1 | * | 3/2012 | Grote et al. | 60/206 |
| 2015/0060466 A1 | * | 3/2015 | Lind | 220/560.1 |
| 2015/0210159 A1 | * | 7/2015 | Maguin et al. | 123/541 |
| 2015/0360560 A1 | * | 12/2015 | Tanaka et al. | 123/541 |

* cited by examiner

*Primary Examiner* — Marguerite McMahon
(74) *Attorney, Agent, or Firm* — Thomas P. Heed

(57) ABSTRACT

A method and system for cooling the fuel contained in the fuel storage tank of motor vehicles using internal combustion engines. The method and system uses tubing in intimate contact with the exterior of the fuel tank to cool the fuel tank. The method and system may optionally employ an insulating wrap or shell to improve thermal efficiency.

16 Claims, 5 Drawing Sheets

CHILLED VEHICLE FUEL STORAGE TANK

FIELD OF INVENTION

This invention relates to internal combustion engines. Specifically, this invention relates to cooling the fuel storage tank for an internal combustion engine.

BACKGROUND OF INVENTION

The internal combustion engine (ICE) is a self-contained powerplant in which a vapor consisting of a fossil fuel (gasoline or diesel) and oxygen is ignited in a sealed combustion chamber. The ICE has revolutionized society, leading the unprecedented industrialization of the western world in the 20$^{th}$ century. Now, ICEs are ubiquitous, being the favored power source for automobiles, light trucks, and heavy trucks.

Between now and the year 2020, it is estimated that the total worldwide car parc (total registered light vehicles) will grow from approximately 620 million units to almost 1 billion units. During that same time, the annual worldwide new vehicles sales will grow from approximately 80 million to 115 million units per year. This explosion in vehicle ownership will be driven by increased vehicle ownership in the BRIC countries (Brazil, Russia, India and China), primarily by growth in Brazil and China.

While the number of operating vehicles, worldwide, is going to increase rapidly, the supply of gasoline and diesel are going to remain constant or decrease. The International Energy Agency states that 2006 was the peak year of petroleum production. The global output of petroleum will now slowly decline. Therefore, the increased consumption of fossil fuels by the BRIC countries will continue to drive the demand for petroleum upwards. This has already led to volatility in the oil markets, with the cost of a barrel of oil peaking at $140 in 2008. Since then, the price for crude oil has varied from a low of $70 per barrel to a high of $110 per barrel. All indicators are that the price of petroleum will steadily increase, faster than other goods, until it is exhausted.

The combustion of fossil fuels, within an ICE, has many additional drawbacks, other than just the price of filling the gas tank. Foremost among these drawbacks is pollution. The pollution caused by ICE fossil fuel combustion is significant contributor to the problem of global climate change. Additionally, gasoline and diesel are volatile organic compounds ("VOCs"), which readily evaporate under all ambient conditions. The propensity for gasoline to evaporate is temperature-dependent. The combustion of fossil fuels leads to particulate pollution and the evaporation of gasoline leads to smog. At a local level, the pollution from fossil fuels makes the air in many major cities, such as Mexico City, Beijing, and Los Angeles, unhealthy to breathe for many people.

Due to global climate change concerns, and concerns regarding the availability and price of petroleum products, the United States has adopted a Corporate Average Fuel Economy ("CAFE") standard that goes from 27.3 m.p.g. in 2010 to a proposed minimum of 46 m.p.g., in the year 2025. Additionally, the Environmental Protection Agency ("EPA") has a number of regulations aimed at reducing pollution from cars and trucks. Among these regulations are restrictions on the escape of evaporated gasoline or diesel both while fueling a vehicle, and while the gasoline or diesel resides in the fuel tank. The automobile industry is now attempting to find additional ways to both improve fuel economy, and reduce overall emissions, including evaporative emissions.

Since the propensity of gasoline and diesel to evaporate with increasing temperature leads to more evaporative emissions in hotter climates and on hotter days, a method or system that could reduce the storage temperature of the fuel in a vehicle would be helpful in meeting the EPA goals for evaporative emissions. All things being equal, reducing evaporative losses boasts fuel efficiency, because less fuel is lost to evaporation. Additionally, as petroleum gets more expensive, reducing evaporative loss will become monetarily efficient.

The existing prior art does not disclose a system focused on cooling the bulk-stored fuel in automobiles and light trucks. U.S. Pat. No. 8,528,774 by named inventor Jorgensen, granted on Sep. 10, 2013, and entitled, "Fuel cooler assembly" ("Jorgensen '774"), teaches a heavy truck diesel tank with an outer and inner shell, intended to cool the fuel returned from the engine. Jorgensen '774 teaches a passive fuel cooler in which the temperature coefficient of the outer shell is higher than the temperature coefficient of the inner shell. The fuel cooler relies on the return fuel being cooled by convection from the air on the outside of the outer shell and by conduction from the inner shell. Jorgensen '774 does not attempt to cool the entire bulk of the fuel, only the return fuel from the engine. Jorgensen '774 is representative of the art in both passively and actively cooling the fuel returned from the engine.

US Patent Application 20130174815 by named inventor Cleary, published on Jul. 11, 2013, entitled, "Method for improving engine performance using a temperature managed fuel system" ("Cleary '815"), teaches temperature control system for the fuel delivery system on a vehicle. Cleary '815 discloses a system that can use, in alternative embodiments, the radiator coolant, intercooler fluid, or exhaust gas to heat the fuel, and can use the intercooler fluid to cool the fuel. However, Cleary '815 does not cool the stored gasoline (i.e., the fuel tank), only the gasoline in the distribution system. The apparent aim of Cleary '815 is not to reduce evaporative emissions, or to reduce the overall loss of evaporated fuel. Rather, Cleary '815 is concerned with insuring that the fuel is at the optimum temperature for combustion. Cleary '815 is representative of the art that seeks to heat or cool the fuel in the fuel distribution system, including heating or cooling carried out at the fuel pump and fuel injectors.

U.S. Pat. No. 8,642,219, by named inventor Ishikawa, entitled, "Cooling system and method of a fuel cell" ("Ishikawa '219") teaches a fuel cell cooling system that uses multiple heat exchangers, and a pump, to circulate radiator coolant to cool the fuel cells. Ishikawa '219 discloses that the fuel cell uses a fuel, but is silent on the storage system of the fuel. Ishikawa '219 is focused solely on cooling the fuel cell stack, itself. Ishikawa '219 is representative of the art that teaches cooling of fuel cell.

US Patent Application 20130206115 by named inventor Kragh, published on Aug. 15, 2013, entitled, "Methods and systems for fuel vapor control" ("Kragh '115"), teaches vapor control system for the fuel storage system of a vehicle with an internal combustion engine. Kragh '115 discloses a vapor cooler to reduce the vapor pressure within the fuel storage tank. The vapor cooler is located interior to the fuel storage tank, in the vapor space. The vapor cooler condenses vapor and routes the condensed vapor to the fuel pump or fuel line. The vapor cooler does not cool the bulk fuel. The vapor cooler does not significantly affect the storage temperature within the tank. Additionally, to whatever extent that the vapor condenser's exterior is significantly different than the interior condition of the fuel tank, the vapor condenser may lead to water condensing from the air, fouling the fuel.

SUMMARY OF THE INVENTION

The present invention improves and expands upon the current prior art by teaching a method and a system for cooling the fuel storage system of an automobile, light truck, or other light vehicle that uses an internal combustion engine.

In one embodiment, the invention is comprised of a series of tubing, connected to the vehicle's radiator, and in intimate contact with the vehicle fuel tank. Intimate contact means that the tubing is attached, surface-to-surface with the fuel tank. The tubing can be placed on top of the fuel tank, on the bottom of the fuel tank, on the side of the fuel tank, or a combination of the top, bottom, and side of the fuel tank. The tubing will be more thermally efficient when placed on the bottom of the fuel tank, or on the side of the fuel tank, because the liquid gasoline or diesel fuel will be on the bottom of the fuel tank. Liquid fuel has superior thermal conduction properties when compared with the vapor at the top of the tank. However, the tubing will be more protected from damage when placed on the top of the fuel tank. All of the placements, bottom, side, top, or a combination of all of them, will allow the tubing to cool the bulk, stored fuel.

In an alternative embodiment, the invention is comprised of a series of tubing, connected to the vehicle's air-conditioner fluid, and in intimate contact with the vehicle fuel tank. Similar with the first embodiment, the tubing can be placed on top of the fuel tank, on the bottom of the fuel tank, on the side of the fuel tank, or a combination of the top, bottom, and side of the fuel tank. The tubing will be more thermally efficient when placed on the bottom or side of the fuel tank. However, the tubing will be more prone to damage when placed on the bottom of the fuel tank, which is an especially important concern with respect to high pressure air conditioner fluid tubing.

Optionally, the tubing is enclosed by an insulating wrap or shell that covers the exterior of the fuel tank. The insulating wrap or shell improves the thermal efficiency of the method and system by reducing the heat transfer between the fuel storage system and the ambient environment. In order to prevent condensation between the optional insulating wrap or shell and the fuel tank, the system has an optional drain tube, allowing condensate to be drained away from the fuel tank.

To ease manufacturing, for fuel tanks constructed out of polymers, the tubing can be integrally molded with the fuel storage tank. This would improve the overall thermal efficiency of the system, and protect the tubing.

BRIEF DESCRIPTION OF THE DRAWINGS

Drawings FIG. 1-7 are included to illustrate the invention.

FIG. 1 is a diagram of generic fuel system.

FIG. 3 is a top view of the present invention, in situ, on top of the fuel tank.

FIG. 4 is an isolated front view of the present invention, in situ, molded on top of the fuel tank.

FIG. 5 is an isolation top view of the tubing used in the present invention.

FIG. 6 is an isometric view of the present invention connecting with a standard automotive radiator.

FIG. 7 is an isometric view of the present invention connecting to a standard automotive air-conditioner compressor.

DETAILED DESCRIPTION OF THE PREFERRED EMBODIMENTS

The following descriptions are not meant to limit the invention, but rather to illustrate its general principles of operation. Examples are illustrated with the accompanying drawings. A variety of drawings are offered, showing various aspects of the invention.

Figure 1:
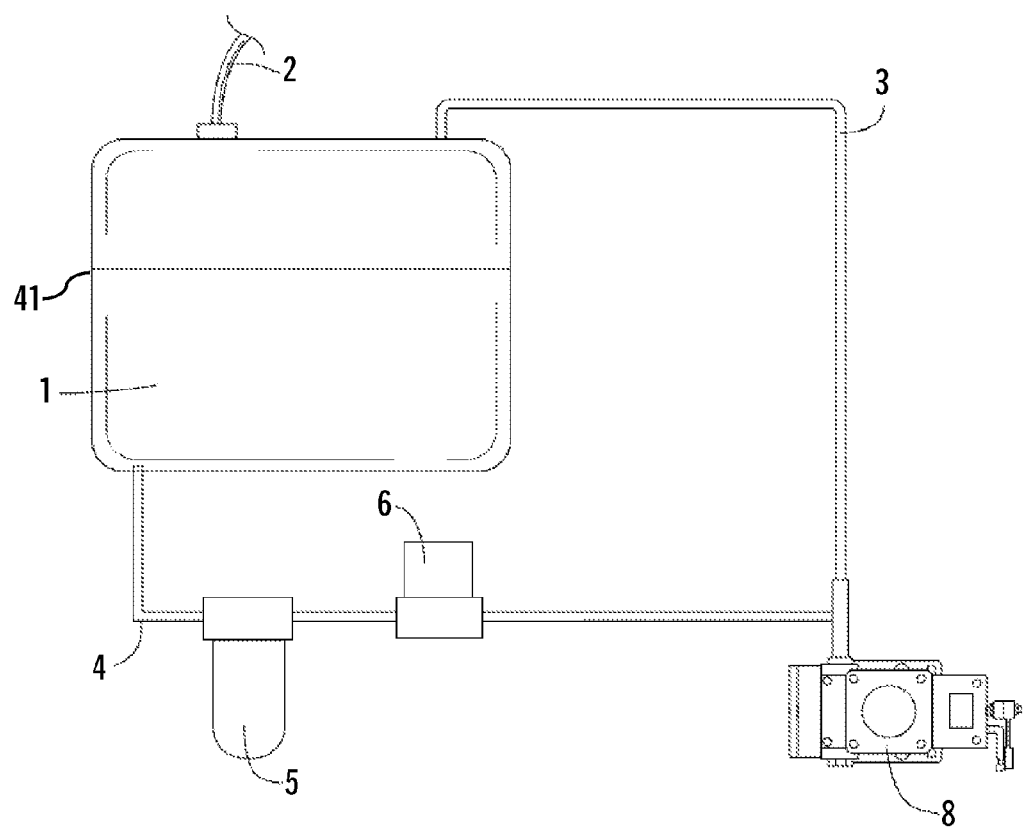

FIG. 1 shows a generic vehicle fuel storage and distribution system, including a fuel tank 1, a fill tube 2, a fuel line 4, a fuel filter 5, a fuel pump 6, and an injector 8. Fuel that is not used by the injector 8 is returned to the fuel tank 1 via the return fuel line 3. The fuel tank 1 has a shell 41.

Figure 2A:
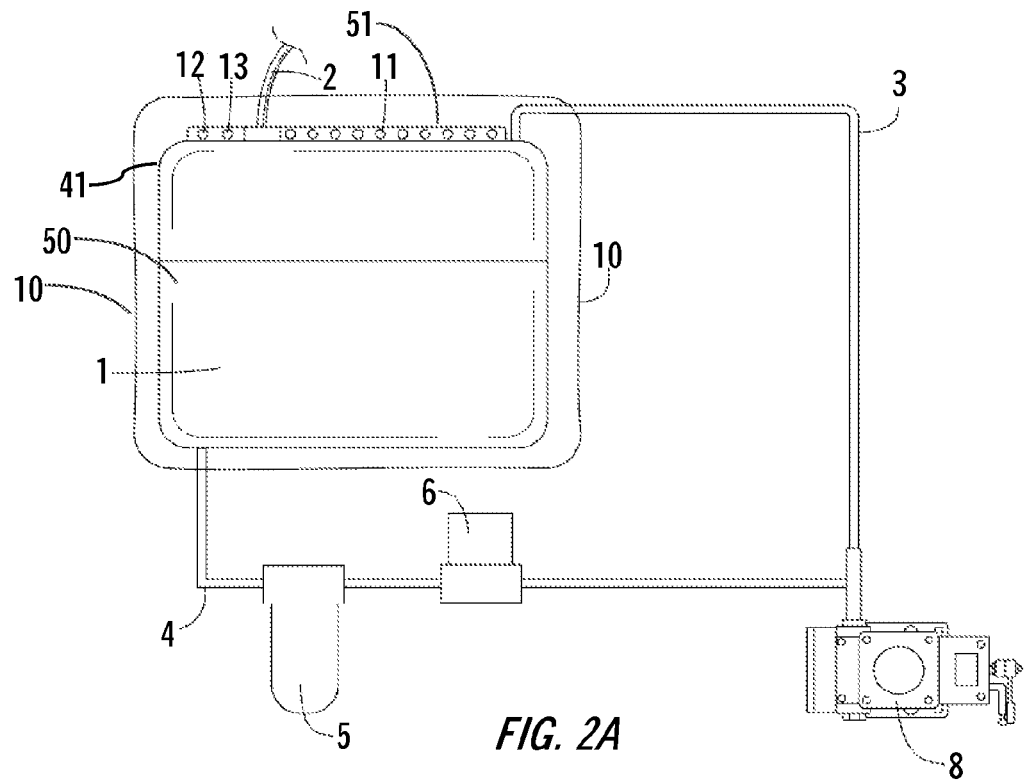
FIG. 2A is diagram of a fuel system, in which the present invention is molded on top of the fuel tank.

FIG. 2A shows a generic vehicle fuel storage and distribution system with the present invention included. The standard elements from FIG. 1 are present: a fuel tank 1, fuel tank shell 41, a fill tube 2, a fuel line 4, a fuel filter 5, a fuel pump 6, an injector 8, and a return fuel line 3. The fuel tank 1 has a volume of bulk fuel 50 contained within the fuel shell 41. In addition, on the top of the tank, there is bulk tubing 11, integrally molded 51 into the fuel tank shell 41, with an intake 13 and an outflow 12. The tubing 11 and fuel tank 1 are wrapped in a insulating wrap 10. In this embodiment, the tubing 11, integrally molded 51 into the fuel tank shell 41, is on top of the fuel tank 1. A cooling fluid flows through the tubing 11. The cooling fluid is delivered by the intake 13. The cooling fluid is removed by the outflow 12. The cooling fluid can be radiator coolant, air-conditioning fluid, or air-conditioning air. The intake 13 and outflow 12 are connected to the appropriate source of said fluid.

Figure 2B:
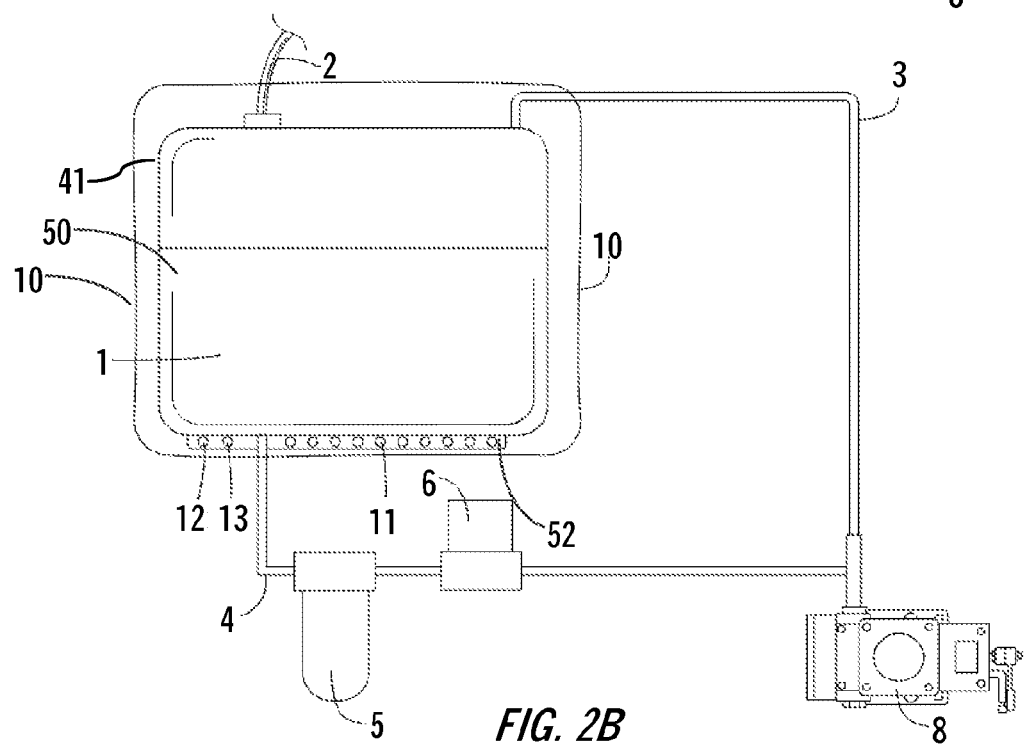
FIG. 2B is a diagram of a fuel system, in which the present invention is molded on bottom of the fuel tank.

FIG. 2B shows a generic vehicle fuel storage and distribution system with the present invention included and placed on the bottom of the fuel tank 1. The standard elements from FIG. 1 are present: a fuel tank 1, a fill tube 2, a fuel line 4, a fuel filter 5, a fuel pump 6, an injector 8, and a return fuel line 3. In addition, on the bottom of the tank, there is bulk tubing 11, integrally molded 52 into the fuel tank shell 41, with an intake 13 and an outflow 12. The tubing 11 and fuel tank 1, containing a volume of bulk fuel 50, are wrapped in a insulating wrap 10.

Figure 3:
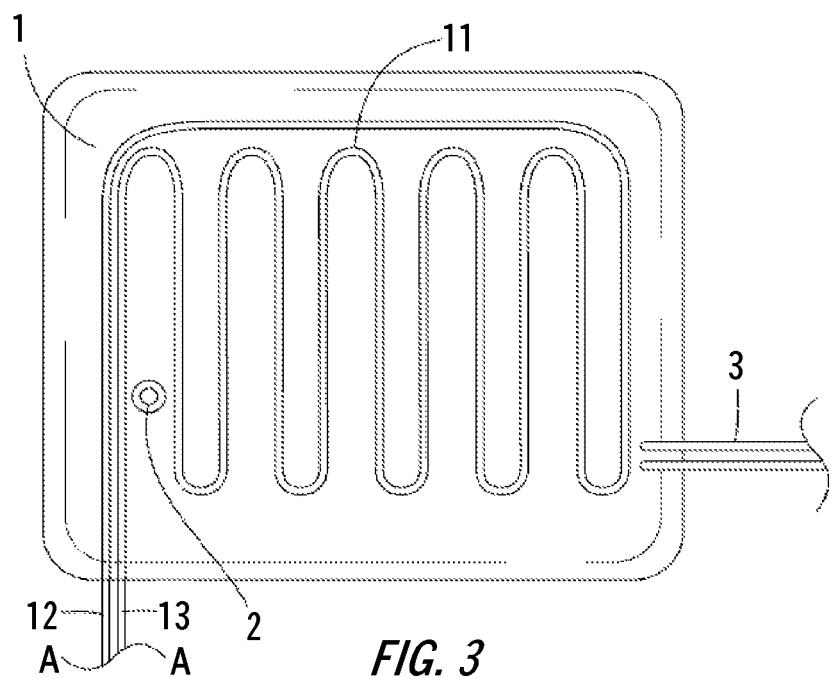

FIG. 3 shows a top view of the present invention. The tubing 11 is placed on top of the fuel tank 1. The fuel tank 1, filler tube 2, return fuel line 3, the tubing 11, the intake 13 and the outflow 12 are shown. The filler tube 2, the intake 13, the outflow 12, and the tubing 11, are all arranged so as not to interfere with one another. Again, the intake 13 and outflow 12 are connected to the appropriate source of said fluid. A cooling fluid flows through the tubing 11. The cooling fluid is delivered by the intake 13. The cooling fluid is removed by the outflow 13. The cooling fluid can be radiator coolant, intercooler fluid, air-conditioning fluid, air conditioning air, or an intermediate fluid provided by a heat exchanger (not shown). The intake 13 and outflow 12 are connected to the appropriate source of said fluid.

Figure 4:
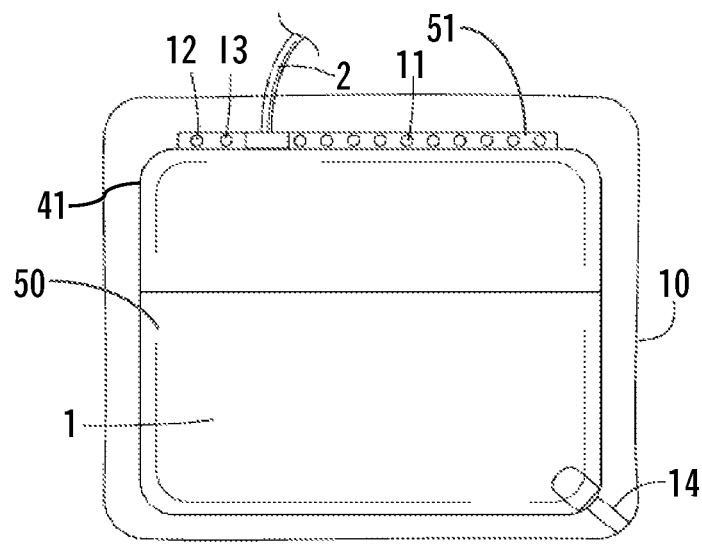

FIG. 4 is an isolated front view of the present invention on top of the fuel tank 1. FIG. 4 includes the fuel tank 1, filler tube 2, insulating wrap 10, tubing 11 integrally molded 51 into the tank shell 41, intake 13, outflow 12, and drain plug 14. Due to the temperature differential between the cooling fluid in tubing 11, intake 13, outflow 12, on the one hand, and the fuel 50 in the fuel tank 1, on the other hand, condensate may form between the fuel tank shell 41 and the insulating wrap 10. In order to remove the condensate, a drain plug 14 is arranged on the bottom of the insulating wrap 10. This will reduce or eliminate corrosion or undue wear of the fuel tank shell 41 caused by the condensate.

Figure 5:
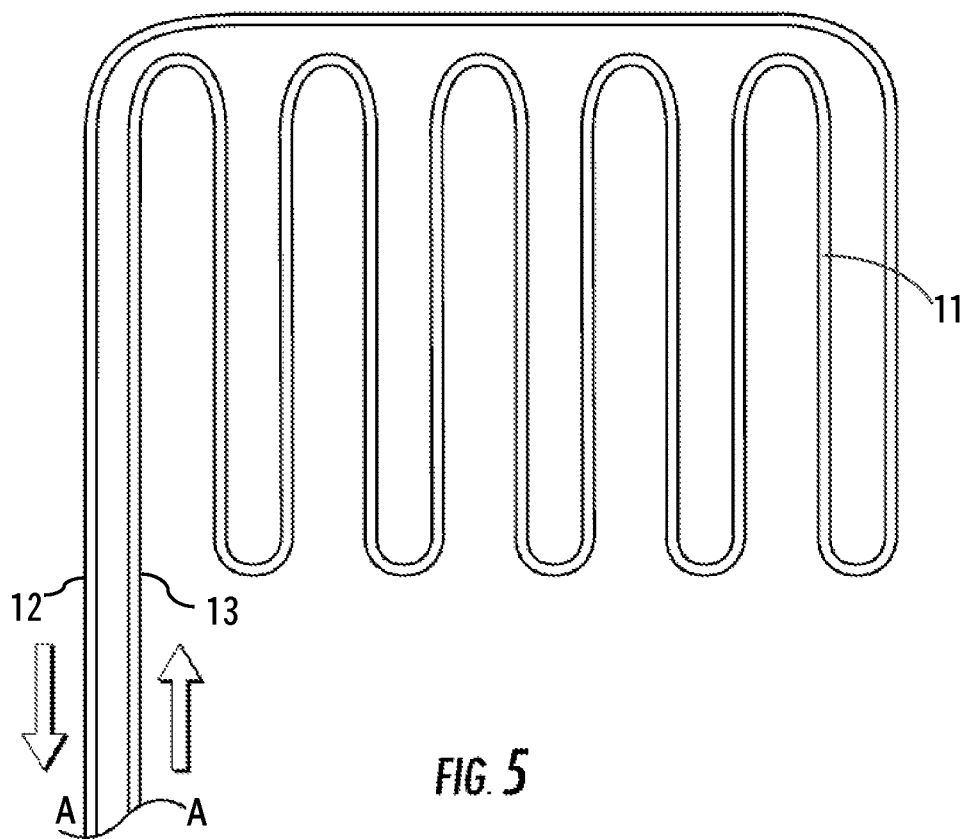

FIG. 5 is an isolated top view of the tubing 11, intake 13, and outflow 12, showing the flow direction of the cooling fluid.

Figure 6:
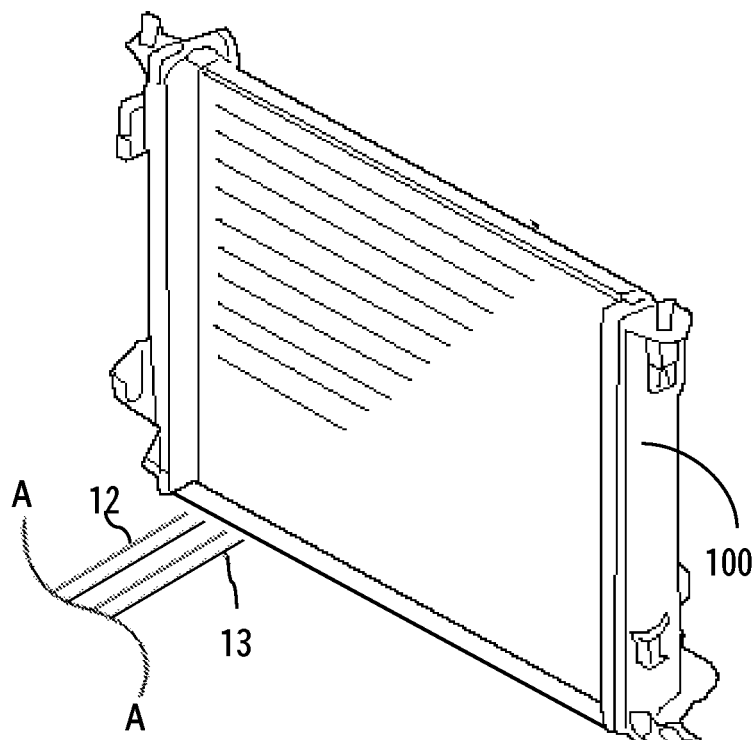
Figure 7:
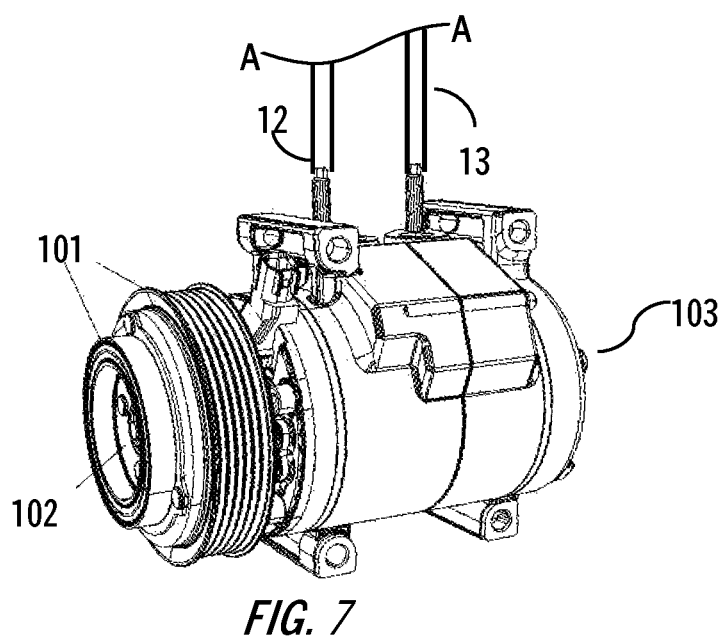

FIG. 6 shows an embodiment of the present invention with the intake 13 and outflow 12 of the present invention attached to a standard automotive radiator 100. The standard automotive radiator 100 circulates the cooling fluid in the tubing 11 connected to the fuel tank 1. FIG. 7 shows an alternative embodiment of the present invention with the intake 13 and outflow 12 of the present invention attached to a standard automotive air-conditioner compressor 103. The air-conditioner compressor 103 has a clutch 102 that causes the drive belt 101 to turn the compressor 103, compressing the cooling fluid, when the clutch 102 is engaged. The compressor 103 circulates the cooling fluid in the tubing 11 connected to the fuel tank 1.

We claim:

1. A method to cool liquid fuel contained in a fuel storage system tank of a vehicle using an internal combustion engine, said method comprising a bulk fuel storage tank that is used as the primary fuel reservoir for the vehicle, said fuel storage tank having an interior and exterior defined by a top surface, a bottom surface, and at least one side surface connecting said top surface to said bottom surface; a cooling fluid; tubing carrying the cooling fluid, said tubing being in surface-to-surface contact with at least one surface of the exterior shell of said fuel storage tank; a means to connect said tubing with a source of the cooling fluid; and a means of circulating said cooling fluid in the tubing; wherein the fuel in the bulk fuel storage tank is maintained at, or below, a pre-determined temperature.

2. The method to cool fuel contained in a fuel storage system tank of a vehicle using an internal combustion engine of claim 1, wherein said tubing is in surface-to-surface contact with the top surface of the fuel storage tank.

3. The method to cool fuel contained in a fuel storage system tank of a vehicle using an internal combustion engine of claim 1, wherein said tubing is in surface-to-surface contact with the bottom surface of the fuel storage tank.

4. The method to cool fuel contained in a fuel storage system tank of a vehicle using an internal combustion engine of claim 1, wherein said tubing is in surface-to-surface contact with at least one side surface of the fuel storage tank.

5. The method to cool fuel contained in a fuel storage system tank of a vehicle using an internal combustion engine of claim 1, wherein said fuel storage tank and said tubing are disposed within an insulating wrap or shell, said insulating wrap or shell having an interior and exterior defined by a top surface, a bottom surface, and at least one side surface.

6. The method to cool fuel contained in a fuel storage system tank of a vehicle using an internal combustion engine of claim 1, wherein said fuel storage tank and said tubing are integrally molded from a plastic, polymer or resin; said tubing being molded and located between the interior and exterior of said fuel storage tank.

7. The method to cool fuel contained in a fuel storage system tank of a vehicle using an internal combustion engine of claim 1, wherein said vehicle contains a radiator coolant system and said tubing is connected to said vehicle's radiator coolant system; and said cooling fluid is radiator coolant.

8. The method to cool fuel contained in a fuel storage system tank of a vehicle using an internal combustion engine of claim 1, wherein said vehicle contains an air conditioner system and said tubing is connected to said vehicle's air conditioner system; and said cooling fluid is air conditioner coolant.

9. A liquid fuel storage system comprising a bulk fuel storage tank that is used as the primary fuel reservoir for the vehicle, said fuel storage tank having an interior and exterior defined by a top surface, a bottom surface, and at least one side surface connecting said top surface to said bottom surface; a cooling fluid; tubing carrying the cooling fluid, said tubing being in surface-to-surface contact with at least one surface of the exterior shell of said fuel storage tank; a means to connect said tubing with a source of the cooling fluid; and a means of circulating said cooling fluid in the tubing; wherein the system maintains the fuel in the bulk fuel storage tank at, or below, a pre-determined temperature.

10. The fuel storage system of claim 9, wherein said tubing is in intimate contact with the top surface of the fuel storage tank.

11. The fuel storage system of claim 9, wherein said tubing is in intimate contact with the bottom surface of the fuel storage tank.

12. The fuel storage system of claim 9, wherein said tubing is in intimate contact with at least one side surface of the fuel storage tank.

13. The fuel storage system of claim 9, wherein said fuel storage, tank and said tubing are disposed within an insulating wrap or shell, said insulating wrap or shell having an interior and exterior defined by a top surface, a bottom surface, and at least one side surface.

14. The fuel storage system of claim 9, wherein said fuel storage tank and said tubing are integrally molded from a plastic, polymer or resin; said tubing being molded and located between the interior and exterior of said fuel storage tank.

15. The fuel storage system of claim 9, wherein said vehicle contains a radiator coolant system and said tubing is connected to said vehicle's radiator coolant system; and said cooling fluid is radiator coolant.

16. The fuel storage system of claim 9, wherein said vehicle contains an air conditioner system and said tubing is connected to said vehicle's air conditioner system; and said cooling fluid is air conditioner coolant.

* * * * *